E. L. Abbott,

Shaft Coupling.

No. 86,260.    Patented Jan. 26, 1869.

Witnesses:
John L. Hayes
Byron Rose

Inventor:
Everett L. Abbott

EVERETT L. ABBOTT, OF BOSTON, MASSACHUSETTS.

Letters Patent No. 86,266, dated January 26, 1869.

IMPROVED SHAFT-COUPLING.

The Schedule referred to in these Letters Patent and making part of the same.

*To all whom it may concern:*

Be it known that I, EVERETT L. ABBOTT, of Boston, in the county of Suffolk, and State of Massachusetts, have invented a new and useful Improvement in Couplings for Shafting; and I do hereby declare that the following is a full, clear, and exact description thereof, reference being had to the drawings hereunto annexed, in which—

Figure 3:
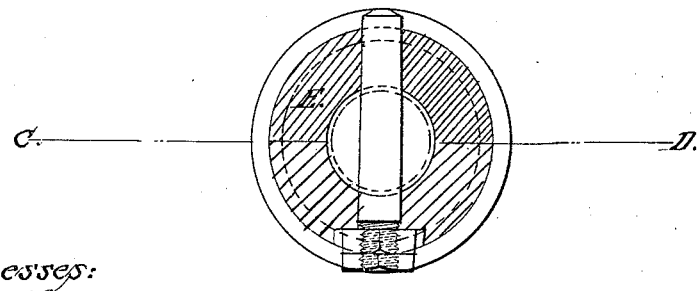

Figure 3, a cross-sectional view.

The nature of my invention consists in constructing the couplings for shafting, used for running machinery, in such a manner that they may be more easily applied, and more efficient for the purpose in view, than those heretofore in use, by means of the devices hereinafter described.

Figure 1:
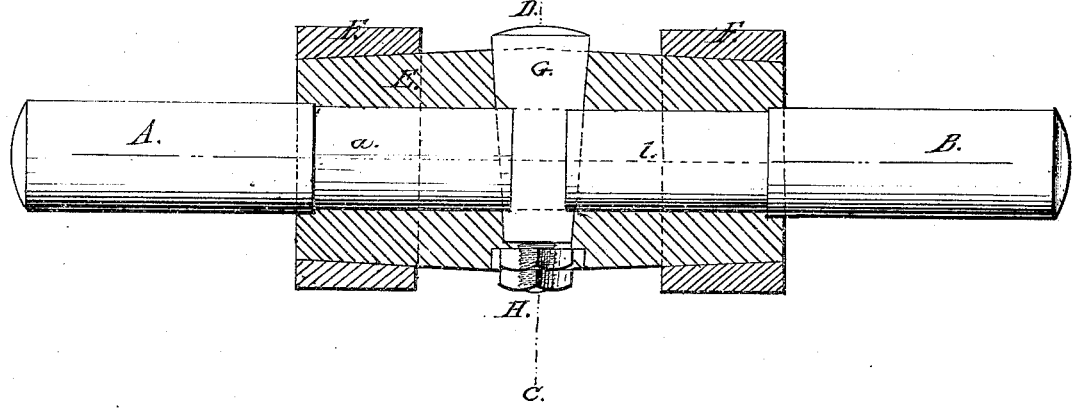
Figure 1 is a longitudinal sectional view of the coupling, and shafting which it connects.
Figure 2:
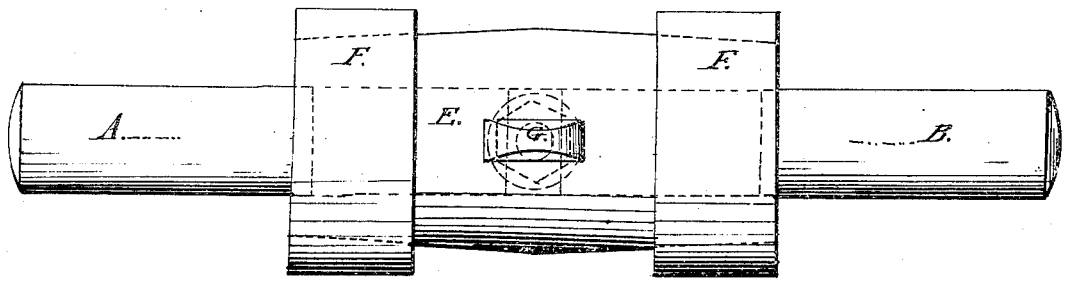
Figure 2 is a side elevation.

The coupling proper, E, shown in elevation in fig. 2, and in section in fig. 1, consists of two pieces, usually of metal, which, when fitted together, as hereafter shown, present a barrel-shaped cylinder, or one slightly tapering toward both ends. The two pieces are made to fit together in the same manner as they would if the cylinder were divided by being sawed longitudinally through its axis.

The coupling or cylinder, E, is made tapering, exteriorly, toward both its ends, to receive the rings F F, which are fitted upon the coupling, when the two parts are brought together, to keep them in place, in the manner hereafter shown.

Interiorly, the coupling or cylinder, when the parts are put together, is constructed as follows:

Circular orifices extend from each end longitudinally, partly through the cylinder. These orifices are made smaller at the ends than near the central portion of the cylinder. In other words, they taper outward.

The orifices are so constructed as to receive the ends of the shafting to be coupled, the ends of the shafting being turned off, so that they shall taper for a certain distance from the ends inwardly.

The tapering sides of the orifices, and the reversed tapering of the ends of the pieces of shafting, A and B, are shown at *a b*, fig. 1.

A tapering slot is cut in each half of the coupling E, and upon each end of the shafting, to receive the key G.

The key G is made tapering, or wedge-shaped, and is so placed, that, passing through the coupling E, and the slots cut in the ends of the shafting, it may, when driven in, press against the ends of the shafting. I usually keep it in place by a nut and screw, as shown at H.

The ends of the shafting may be placed further apart, and two keys may be used, one to press against each end of the shafting, but I prefer to use but one key.

The manner in which the devices above described are applied, is as follows:

The pieces of shafting being put in their bearings, the two ends are brought near each other. The two parts of the coupling are placed upon the two pieces of shafting to be connected, so as to form a complete cylinder. The tapering ends of the shafting fit into the orifices tapered reversely; the rings F F having been previously put upon the ends of the coupling, and pressed by the hand, or a gentle blow of the mallet, to their place, where they may be held by set-screws. The key G is then driven in. The key, pressing upon the ends of the shafting, drives them to their bearings.

It is obvious that with this arrangement, the pieces of shafting are kept tightly and firmly in their bearings by the application of the power of two wedges, that of the key, and that of the tapering end of the shaft. It is to the operation of these two wedges, thus combined, that the efficiency of the coupling is in a great degree due.

An important advantage of the mode of coupling herein described is, that one length of shafting may be taken out without disturbing the shafting at either end.

With the above devices, in case it is desired to move a pulley from one side of the coupling to the other, it is only necessary to remove the coupling, and still preserving the shaft in place, to move the pulley, as desired.

What I claim as my invention, and desire to secure by Letters Patent, is—

1. In the application of shafting for moving machinery, the combination of a shaft, tapering from its end, with a tapering key pressing against the end of the shaft, and passing transversely through it, substantially as described.

2. The tapered ends of the shafts A and B, in combination with the coupling E, the rings F F, and the key G, substantially as described.

E. L. ABBOTT.

Witnesses:
JOHN L. HAYES,
BYRON ROSE.